(12) United States Patent
Mansson et al.

(10) Patent No.: US 7,641,228 B2
(45) Date of Patent: Jan. 5, 2010

(54) AIR BAG SYSTEM FOR MOTOR VEHICLES

(75) Inventors: Johan Mansson, Boras (SE); Fredrik Kjell, Alingsas (SE); Henrik Ohrvall, Alingsas (SE); Anders Palo, Gothenburg (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/053,106

(22) Filed: Mar. 21, 2008

(65) Prior Publication Data

US 2008/0191453 A1    Aug. 14, 2008

Related U.S. Application Data

(63) Continuation of application No. PCT/EP2006/009271, filed on Sep. 25, 2006.

(30) Foreign Application Priority Data

Sep. 27, 2005    (DE) .................. 10 2005 046 267

(51) Int. Cl.
*B60R 21/16* (2006.01)
(52) U.S. Cl. .................................. 280/730.2
(58) Field of Classification Search .............. 280/730.2, 280/730.1
See application file for complete search history.

(56) References Cited

U.S. PATENT DOCUMENTS

| 5,324,072 A | * | 6/1994 | Olson et al. ............... 280/730.2 |
|---|---|---|---|
| 5,575,497 A | | 11/1996 | Suyama et al. |
| 5,647,609 A | * | 7/1997 | Spencer et al. ............ 280/730.2 |
| 2001/0042975 A1 | * | 11/2001 | David et al. ............... 280/730.2 |
| 2004/0164528 A1 | * | 8/2004 | Boegge et al. ............ 280/730.2 |
| 2005/0057024 A1 | * | 3/2005 | Weston et al. ............. 280/730.2 |
| 2007/0216142 A1 | * | 9/2007 | Honda et al. .............. 280/730.2 |

FOREIGN PATENT DOCUMENTS

| DE | 42 23 620 A1 | | 1/1993 |
|---|---|---|---|
| DE | 100 24 293 A1 | | 11/2001 |
| DE | 101 19 351 C1 | | 7/2002 |
| GB | 2220620 A | * | 1/1990 |
| JP | 05139232 A | * | 6/1993 |
| JP | 05162598 A | * | 6/1993 |
| JP | 05193433 A | * | 8/1993 |
| JP | 05238347 A | * | 9/1993 |
| JP | 06227344 A | * | 8/1994 |
| JP | 06227348 A | * | 8/1994 |
| WO | WO 00/40439 A | | 7/2000 |

* cited by examiner

*Primary Examiner*—Faye M. Fleming
(74) *Attorney, Agent, or Firm*—Brinks Hofer Gilson & Lione

(57) ABSTRACT

In at least one embodiment, an air bag system comprises an air bag having an impact surface which in a non-inflated state is arranged in a housing located below the upper edge of a windowsill of a vehicle door. In an inflated state, at least part of the impact surface is positioned above the windowsill. There is a supporting surface for the air bag below the upper edge of the windowsill. The air bag defines a main chamber and a supporting chamber. The impact surface forms part of the main chamber. The supporting chamber, in an inflated state, is situated between the main chamber and the supporting surface and is supported at least in part by the supporting surface.

9 Claims, 2 Drawing Sheets

AIR BAG SYSTEM FOR MOTOR VEHICLES

CROSS REFERENCE TO RELATED APPLICATIONS

This application claims priority to PCT patent application WO2007/036336 filed Sep. 25, 2006 and DE 10 2005-046 267.7 filed on Sep. 27, 2005.

FIELD OF THE INVENTION

The invention relates to an air bag system for motor vehicles.

BACKGROUND OF THE INVENTION

In the state of the art, so-called side air bags for motor vehicles are known that are arranged either in the seat or in the lateral structure of the motor vehicle below the side window. Such side air bags are intended to protect the head and thorax of the occupant in the event of a side impact. As the head, and usually also part of the thorax of the occupant are above the windowsill of the side door, i.e. at the height of the side window, the side air bag is usually supported against the side window and most often, at least in part, against the B-pillar.

In convertibles and roadsters in particular—and to some extent in coupes as well—the B-pillar may be absent and the vehicle may be driven with the side windows rolled down. Consequently no supporting surface may be available at the height of the occupant's head.

The generic patent DE 100 24 293 A1 proposes arranging a housing, which accommodates a folded air bag a short distance below the windowsill and provides a supporting section by which the air bag is supported during expansion. However, further improvements may be desirable.

SUMMARY OF THE INVENTION

The present invention seeks to develop an air bag system such that protection of the occupant in the event of a side impact collision is further improved.

In at least one embodiment of the present invention, a housing that accommodates the non-inflated air bag is arranged below the windowsill in such a way that between the exit opening of the housing and the upper edge of the windowsill, there is a supporting surface for the air bag. This supporting surface can be part of the inner lining of the door or part of the housing. The air bag itself features a main chamber with an impact surface and a supporting chamber that is situated between the main chamber and the supporting surface. The main chamber is therefore not supported directly by the supporting surface, but only indirectly by the supporting chamber. In this way, a reasonably thick air bag is provided in the area of the supporting surface, so as to improve the supporting effect.

Dividing the air bag into two parts in the area of the supporting surface also provides the possibility of configuring the supporting chamber with a height that is lower than that of the main chamber, which, with the same gas generator performance, may lead to correspondingly faster filling, without having to accept losses with regard to the performance of the system. In addition, due to the configuration of the air bag system in accordance with the invention, it may be possible to position the supporting surface relative to the occupant so as to improve the retaining effect on the occupant, particularly through an early interfacing between the shoulder and head area of the occupant with the impact surface of the air bag.

BRIEF DESCRIPTION OF THE DRAWINGS

Preferred embodiments of the invention become apparent from the claims, as well as by reference to the examples of embodiments shown in more detail in the figures, wherein:

DETAILED DESCRIPTION

Figure 1:
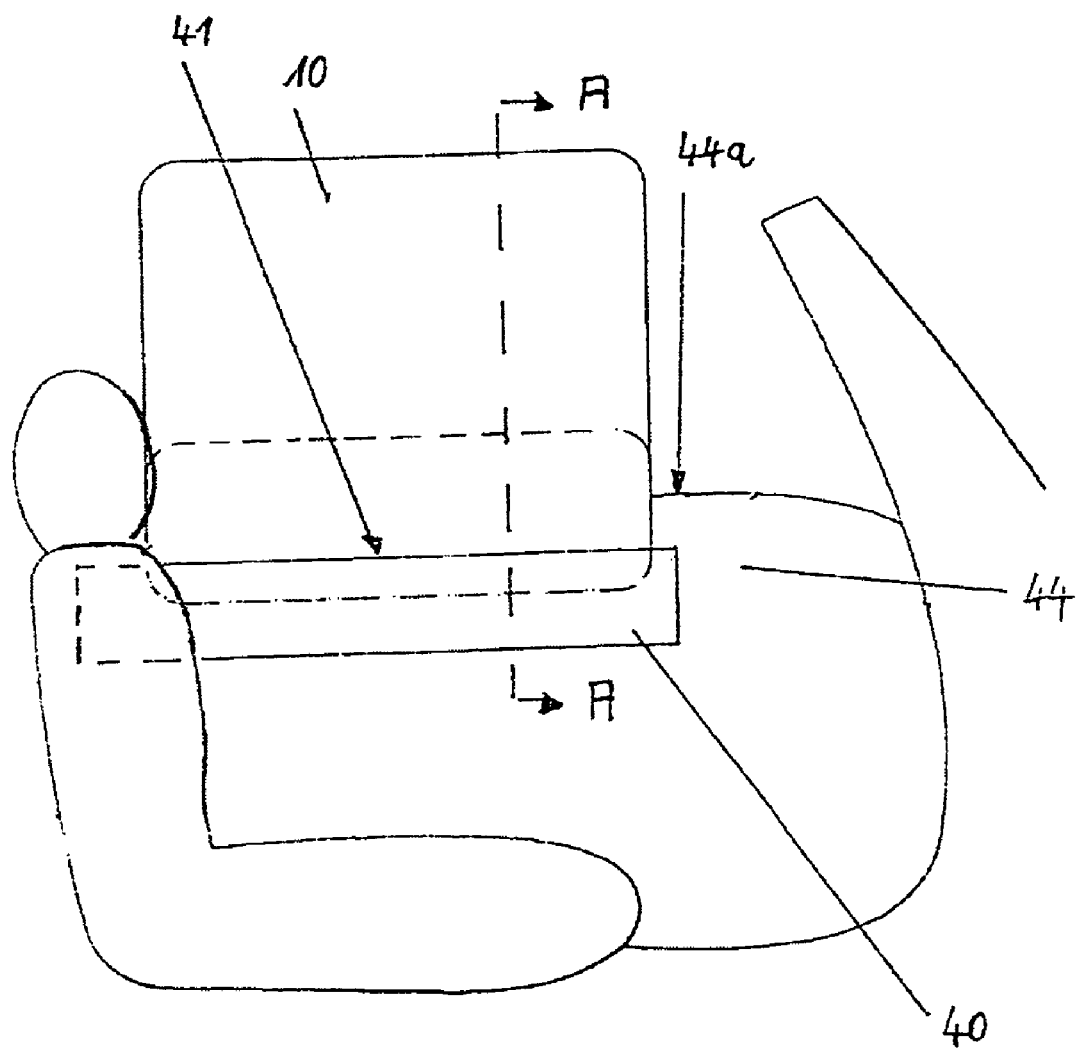
FIG. 1 illustrates a schematic lateral view of an air bag system in accordance with an embodiment of the present invention.

FIG. 1 shows a schematic view, from the inside, of the front-seat area of an open-topped or convertible vehicle. On the interior side of the door 44 below the upper edge 44a of the windowsill, the housing 40 is arranged, which completely accommodates the air bag 10 in its non-inflated state. FIG. 1 shows the state in which the air bag 10 is completely inflated, whereby a major part of the air bag is disposed above the upper edge 44a of the windowsill. The housing 40 can be an integral part of the interior lining of the door or otherwise. A gas generator is also arranged (not shown in FIG. 1) proximate the housing (e.g. in or on the housing 40).

Figure 2:
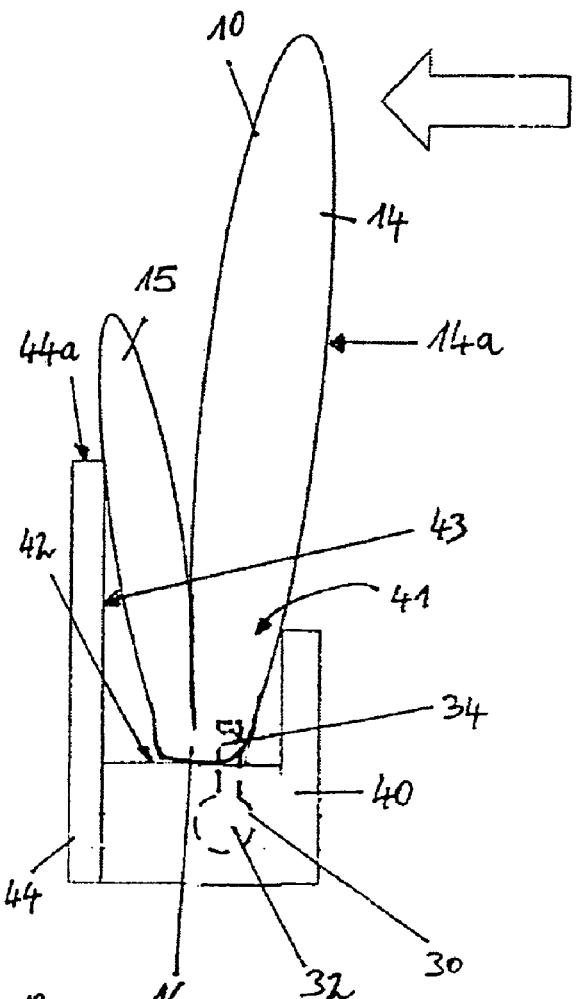
FIG. 2 is a cross section as seen in FIG. 1.

The structure and functioning of the air bag system is illustrated in FIG. 2, which is a cross-sectional view along section A-A in FIG. 1. The air bag 10 features a main chamber 14 and a supporting chamber 15, which are connected by means of filling chambers 16. The housing 40 is arranged below the upper edge 44a of the windowsill such that there is a supporting surface between the housing floor 42, to which the air bag 10 is attached, and the upper edge 44a of the windowsill. Notably, the supporting surface is formed in this example by a section of the internal or interior side 43 of the door. The supporting surface could also, for example, be part of the housing 40 (not shown) or some other vertically extending structure. The exit opening 41 of the housing is preferably arranged below the upper edge 44a of the windowsill, so that at least one section of the supporting surface is situated below the exit opening 41 in the housing 40.

As can be seen from FIG. 2, the supporting chamber 15 is supported by the supporting surface. The main chamber 14 is in turn supported by the supporting surface. If the occupant is thrown onto the impact surface 14a of the main chamber 14, the force is transferred through the main chamber and the supporting chamber to the supporting surface (e.g. door 44). In one example, this arrangement is positioned so that the impact surface 14a of the main chamber 14, originating from the housing floor 42, inclines in the direction of the occupant so that the main chamber 14 interfaces with the occupant at an early point in time. In order to ensure sufficient support for the main chamber 14, the supporting chamber 15 may be arranged outboard relative to the main chamber 14 in the installed state of the airbag system.

A gas generator 30 is in fluid communication with the air bag 10. In one example, the outlet section 34 of the gas generator 30 protrudes into the main chamber 14. The generating section 32 of the gas generator 30 is situated outside the air bag below the floor of the housing 42. The incoming gas fills the main chamber 14 first, so that the inflated main chamber is filled early and is available to support the occupant. Gas continues to flow out of the main chamber 14 via the filling chambers 16 into the supporting chamber 15, which, depending on the configuration of the filling chambers 16, inflates at about the same time as the main chamber 14, or after the main chamber 14, and at least partially fills the space between the main chamber 14 and the supporting surface.

Figure 3:
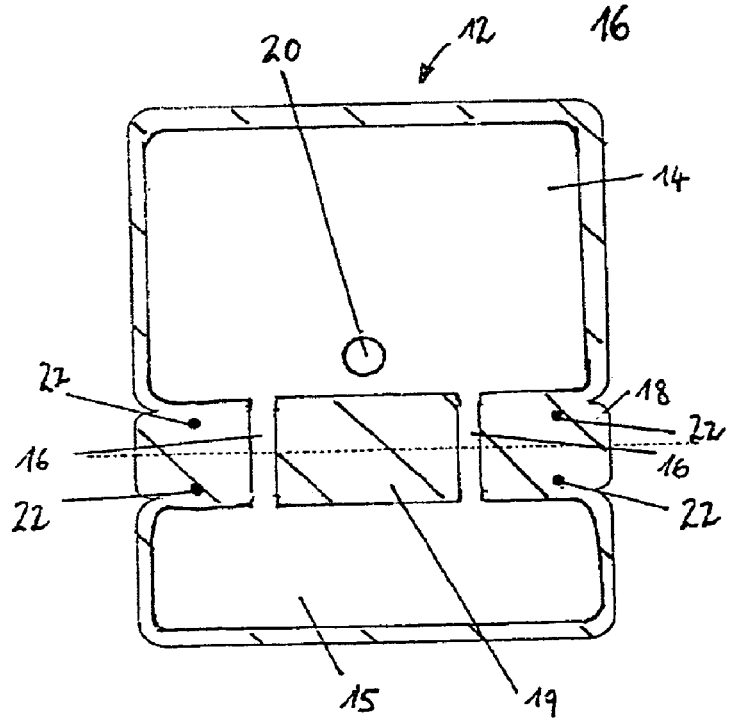
FIG. 3 illustrates a layer of fabric of an air bag in accordance with an embodiment of the present invention.

FIG. 3 shows an extended first fabric layer of the air bag 10. The entire air bag 10 can be sewn together of two congruent layers of fabric, or the air bag 10 can be formed in one piece, whereby two layers of fabric, which are also congruent, are interwoven in non-inflatable areas 18. In the case of a sewn air bag, the two layers of fabric are sewn together, at least in sections, in the non-inflatable area 18. The non-inflatable area 18 is shown as hatched. It can be seen that the filling chambers 16 may be configured as hose-like areas in a non-inflatable floor area 19 outside the filling chambers 16, said floor area also featuring holes 22 for fixing the air bag 10 to the housing floor 42. In this example configuration, manufacturing the air bag may be very simple and may not require significantly more effort and expense than a comparable single-chamber air bag. The air bag is filled by the gas generator, which may, for example, protrude through the inlet opening 20 in the main chamber.

In the installed state of the air bag, the floor area 19 is connected to the housing floor 42, and the two chambers extend, in a folded, non-inflated state, in the direction of the exit opening 41. The chambers can be folded jointly or independently of each other.

According to the principles of the present invention, the main and supporting chambers could be configured completely separately and filled by separate gas generators, which may however require additional work and expense as well as a greater need for space within the side structure of the motor vehicle.

As a person skilled in the art will appreciate, the above description is meant as an illustration of implementation of the principles of this invention. This description is not intended to limit the scope or application of this invention in that the invention is susceptible to modification, variation, and change, without departing from the spirit of this invention, as defined in the following claims.

The invention claimed is:

1. An air bag system for motor vehicles, the system comprising: an air bag having at least one impact surface for lateral restraint of a vehicle occupant, the air bag in a non-inflated state is arranged in a housing located below an upper edge of a windowsill of a vehicle door, and the air bag in an inflated state assumes a protective position that is at least in part projected above the upper edge of the windowsill, wherein below the upper edge of the windowsill along the vehicle door there is a supporting surface for the air bag which extends generally vertical, the air bag defining a main chamber and a supporting chamber, wherein the impact surface is formed by at least part of the main chamber, and the supporting chamber in the inflated state is positioned between the main chamber and the supporting surface so as to be directly supported at least in part by the supporting surface and to cooperate with the main chamber to hold a side of the vehicle occupant for providing the lateral restraint of the vehicle occupant.

2. An air bag system according to claim 1, wherein the main chamber and the supporting chamber are connected by at least one filling chamber and are filled by a common gas generator.

3. An air bag system according to claim 2, wherein the gas generator is connected directly to the main chamber.

4. An air bag system according to claim 1, wherein the air bag includes two layers of fabric connected at their edges.

5. An air bag system according to claim 1, wherein a height of the supporting chamber is lower than a height of the main chamber.

6. An air bag system according to claim 1, wherein the supporting surface is part of an interior side of the vehicle door.

7. An air bag system according to claim 1, wherein the supporting chamber extends above the windowsill.

8. An air bag system according to claim 3, wherein the connection of the gas generator to the main chamber causes the main chamber to fill first relative to the supporting chamber.

9. An air bag system according to claim 1, wherein the air bag is a side air bag.

\* \* \* \* \*